US006201676B1

(12) United States Patent
Glaser
(10) Patent No.: US 6,201,676 B1
(45) Date of Patent: Mar. 13, 2001

(54) TIME DELAY DEVICE

(75) Inventor: Michael D. Glaser, Brookfield, WI (US)

(73) Assignee: McGran-Edison Company, Houston, TX (US)

(*) Notice: Subject to any disclaimer, the term of this patent is extended or adjusted under 35 U.S.C. 154(b) by 0 days.

(21) Appl. No.: 09/309,374

(22) Filed: May 11, 1999

(51) Int. Cl.[7] .......... H02H 3/00

(52) U.S. Cl. .......... 361/71; 361/75; 361/202

(58) Field of Search .......... 361/71–75, 152, 361/170, 195, 202

(56) References Cited

U.S. PATENT DOCUMENTS

| | | |
|---|---|---|
| 2,554,281 | 5/1951 | Von Mehren . |
| 2,590,634 | 3/1952 | Ludwig et al. . |
| 2,704,311 | 3/1955 | Thumim . |
| 2,738,394 | 3/1956 | Matthews . |
| 2,739,202 | 3/1956 | Wallace et al. . |
| 2,752,534 | 6/1956 | Edwards . |
| 2,769,057 | 10/1956 | Thumim . |
| 2,777,031 | 1/1957 | Wallace . |
| 2,785,345 | 3/1957 | Chabala . |
| 2,792,530 | 5/1957 | Wallace . |
| 2,804,521 | 8/1957 | Van Ryan et al. . |
| 2,810,038 | 10/1957 | Van Ryan et al. . |
| 2,832,011 | 4/1958 | Ashenden . |
| 2,835,763 | 5/1958 | Van Ryan et al. . |
| 2,875,381 | 2/1959 | Chabala . |
| 2,892,057 | 6/1959 | MacNeill et al. . |
| 2,904,656 | 9/1959 | Harry . |
| 2,907,562 | 10/1959 | Van Ryan et al. . |
| 2,911,499 | 11/1959 | Cameron et al. . |
| 2,926,228 | 2/1960 | Date et al. . |
| 2,972,709 | 2/1961 | Chabala . |
| 3,019,317 | 1/1962 | Gauvreau . |
| 3,030,471 | 4/1962 | Harm . |
| 3,052,779 | 9/1962 | Schwandes et al. . |
| 3,206,578 | 9/1965 | Pendy, Jr. . |
| 3,250,876 | 5/1966 | Schultz et al. . |

(List continued on next page.)

OTHER PUBLICATIONS

Cooper Power Systems, "Series Trip Solenoid", Types VW and WVW Maintenance Instructions, S280–30–7, pp. 12–13, 1999 (No Month).

"Cooper Power Systems Products—Reclosers", Internet at http://www.cooperps.com/ky/p–rclr.html#top, Apr. 1, 1999, pp. 1 and 2.

"Cooper Power Systems—What is a Recloser? R280–90–8", Internet at http://www.cooperps.com/ky/bulletins/recloser/recloser.html#top, Apr. 1, 1999, pp. 1 and 2.

Cooper Power Systems, "Reclosers, Time–Current Curves", R280–91–6, Jul. 1980, pp. 1–14.

Cooper Power Systems, "Reclosers, Maintenance Instructions", S280–30–7, Dec. 1986, pp. 1–21.

*Primary Examiner*—Michael J. Sherry
(74) *Attorney, Agent, or Firm*—Fish & Richardson P.C.

(57) ABSTRACT

A hydraulic time delay device couples to a fault-sensing element in a circuit recloser. The time delay device includes a piston that has an external connection and is operable to move through a housing in the device to cause hydraulic fluid in the housing to flow out of the housing and into a passageway. The time delay of the time delay device corresponds to a time required to move the piston. A first adjustable orifice is formed the passageway to define an adjustable first fluid flow path through the passageway. An adjustable valve is positioned to provide an adjustable second fluid flow path through the passageway. A second adjustable orifice is formed in the passageway to provide further adjustment of the second fluid flow path. Adjustment of the first orifice, the valve, and the second orifice affect the time required to move the piston.

18 Claims, 8 Drawing Sheets

U.S. PATENT DOCUMENTS

| | | | |
|---|---|---|---|
| 3,612,799 | | 10/1971 | Carter et al. . |
| 3,614,357 | | 10/1971 | Jensen . |
| 3,634,640 | | 1/1972 | Jawelak et al. . |
| 3,662,220 | * | 5/1972 | Riebs ..................................... 361/97 |
| 3,725,623 | | 4/1973 | Fischer et al. . |
| 3,725,830 | | 4/1973 | Rigert . |
| 4,166,937 | | 9/1979 | Imam et al. . |
| 4,855,862 | | 8/1989 | Wainio et al. . |
| 5,663,712 | | 9/1997 | Kamp . |

* cited by examiner

TIME DELAY DEVICE

TECHNOLOGY FIELD

This invention relates to a time delay device for a circuit recloser.

BACKGROUND

On high voltage lines, many problems, such as lightning striking the line, tree branches or wires blowing in a wind gust, or animals on the lines, are only temporary. However, even these temporary problems can cause permanent damage to electrical equipment if power is not shut off for their duration. A device such as a recloser may be used in high voltage lines to deal with such problems.

A recloser is an automatic, high-voltage electric switch that shuts off electric power in an electric distribution line when a problem, such as a short circuit, occurs. After shutting off power, and waiting for expiration of a time delay, the recloser automatically restores power and tests the distribution line to determine whether the problem has been removed. If the problem is still present, the recloser shuts off power again. The recloser may repeat the shut-off-wait-restore process several times. If the fault is permanent, the recloser may shut off the power permanently after a certain number of repetitions (for example, three or four).

SUMMARY

The invention provides a hydraulic time delay device for coupling to a fault-sensing element in a circuit recloser. To this end, the time delay device includes a piston having an external connection and operable to move through a housing in the device to cause hydraulic fluid in the housing to flow out of the housing and into a passageway. A time delay of the time delay device corresponds to a time required to move the piston.

In one general aspect, the time delay device includes a first adjustable orifice formed in the passageway to define an adjustable first fluid flow path through the passageway, and an adjustable valve positioned to provide an adjustable second fluid flow path through the passageway. A second adjustable orifice formed in the passageway provides further adjustment of the second fluid flow path. Adjustment of the first orifice, the valve, and the second orifice affect the time required to move the piston.

Embodiments may include one or more of the following features. The time delay device may further include a piston spring inside the housing. The piston moves through the housing in a first direction in response to a force on the external connection, and the piston spring asserts a force on the piston in an opposite direction. The piston may include an aperture that closes when the piston moves in the first direction to push the hydraulic fluid into the passageway, and opens when the piston moves in the opposite direction to permit the hydraulic fluid to flow through the aperture.

Adjustments to the orifices may be made by adjusting their sizes. Adjustments to the valve may be made by adjusting the position of the valve.

The time delay device may further include an adjustable screw that applies a force to the valve through a valve spring which couples the valve to the screw. The force applied to the valve may modify the second fluid flow path. A set screw positioned inside the adjustable screw may be used to adjust the second orifice.

The circuit recloser may be used to open contacts in the circuit after the time delay. The fault sensing element may be linked to the external connection of the piston.

Other features and advantages will be apparent from the following description, including the drawings, and from the claims.

DETAILED DESCRIPTION

Figure 1:
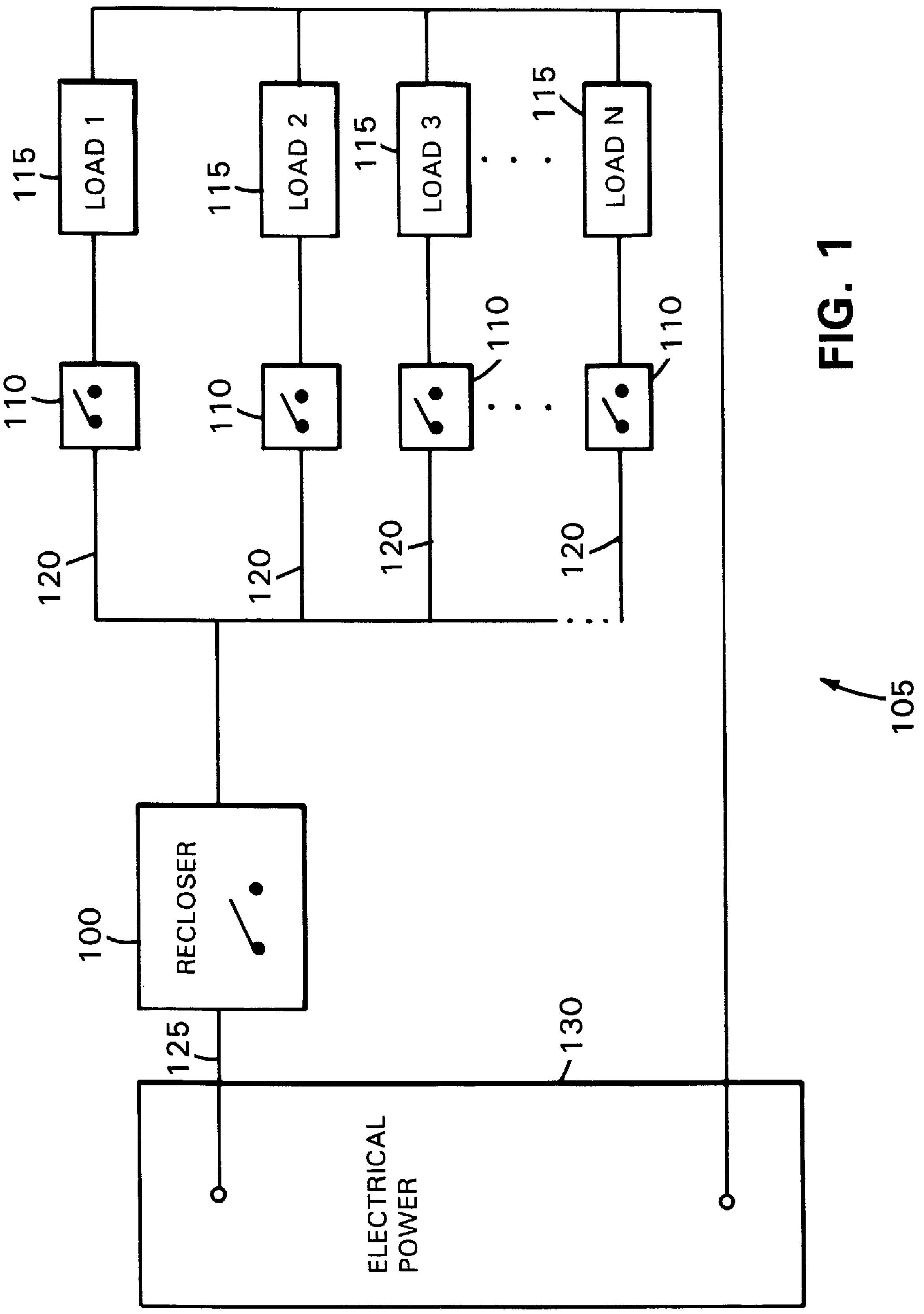
FIG. 1 is a block diagram of an electric distribution system that uses a circuit recloser.

Referring to FIG. 1, a recloser 100 is used in an electric distribution system 105 in conjunction with other protective devices 110, such as fuses or other reclosers, to supply power to at least one load 115 in a feeder line 120 that emanates from a main power line 125. The recloser 100 is connected in series with the main power line 125, which is connected to a high-voltage source 130. Upon occurrence of a fault, the recloser 100 executes a series of circuit opening and closing operations. These operations continue until the fault clears or the recloser 100 determines that the fault is permanent and leaves the circuit in an open state.

It is desirable to vary timing of the open/close operations. For example, when the fault first occurs, the recloser 100 will open and close the power line rapidly to avoid unnecessary damage to protective devices 110 in the circuit. If, however, the fault does not clear after the series of rapid operations, the fault may be considered permanent. Thus, it may be necessary to isolate certain feeder lines 120, or even the main power line 125, depending on the location of the fault. Therefore, following the rapid open/close operations, the recloser 100 will open and close the main power line 125 at a slower rate to permit protective devices 110 to carry excessive current for a time sufficient to open one or more of the protective devices 110 and isolate the corresponding feeder lines 120. If a fault exists in one of the feeder lines 120, it is then isolated, and the recloser 100 remains closed at the end of the open/close operation to keep the main power line 125 energized. On the other hand, if the fault exists in the main power line 125, the recloser 100 may open again after a time delay and remain open until manually reset.

Figure 2:
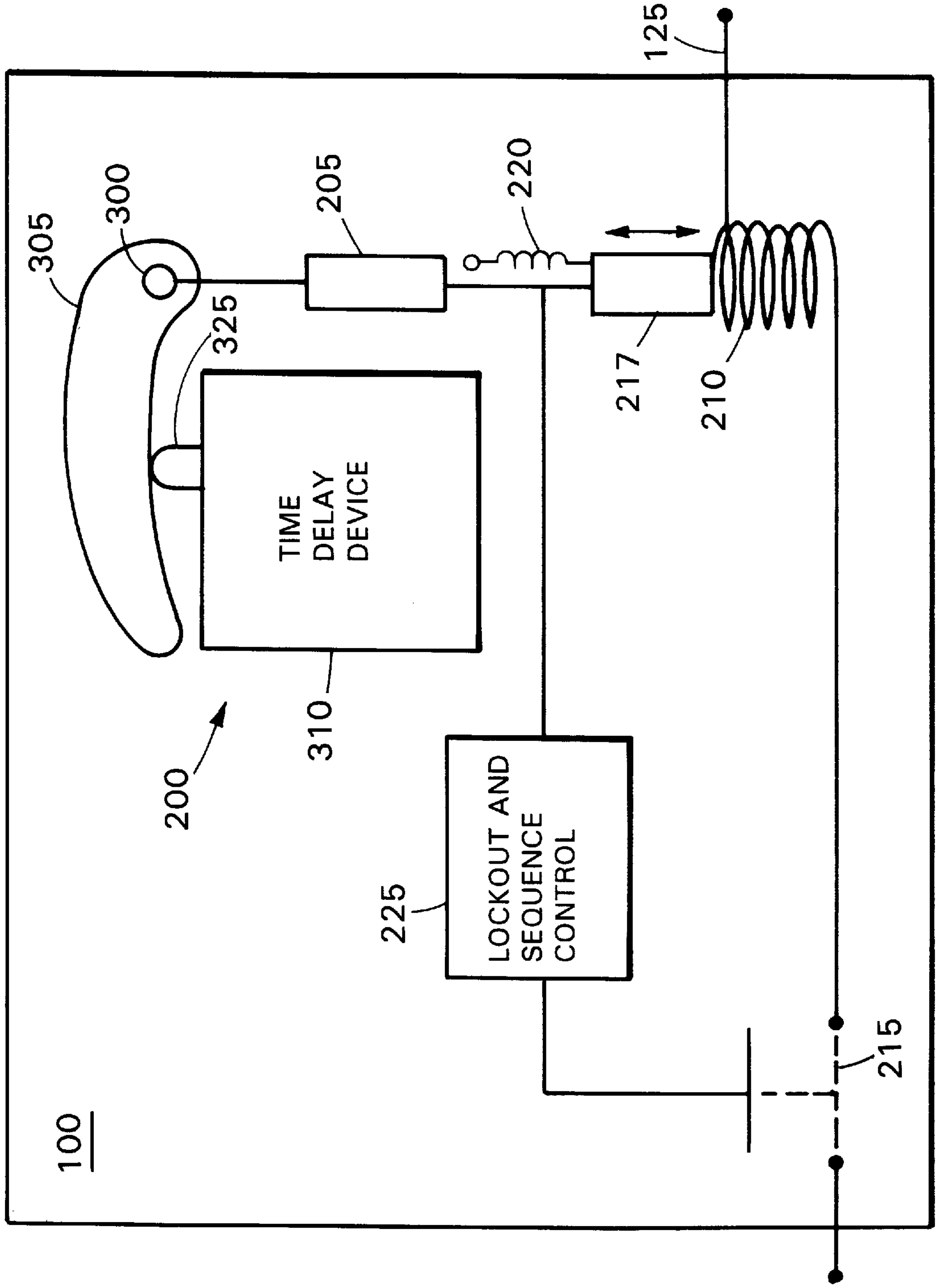
FIG. 2. is a block diagram of operation of a circuit recloser of the system of FIG. 1.

Referring also to FIG. 2, time delay for recloser operations is accomplished using a mechanical time delay device

200, which has predetermined time/current characteristics for different timing operations. Because timing operations affect other protective devices 110 associated with the electric distribution line 105, such as fuses or other reclosers, the time delay device 200 used in the recloser 100 coordinates with these other protective devices 110.

The time delay has been difficult to adjust to meet timing limits set by protective devices 110 and loads 115 in the lines 120, 125. This is due to the fact that only two adjustments (a low pressure orifice and a high pressure spring adjustment) are typically provided to adjust the timing of three different current ranges. The new design for the time delay device 200 adds a high pressure orifice adjustment to permit independent timing adjustment of all three different current ranges.

A linkage 205, which selectively couples an electric current sensing solenoid 210 to the time delay device 200, is used to determine a speed of the open/close operation sequence. Movement of a magnetic plunger 217 in the solenoid 210 causes contacts 215 in the main power line 125 to open or close. A lockout and sequence control system 225 in the recloser 100 initiates the opening and closing of the contacts 215 based on operation of the plunger 217. Opening of the contacts 215 (that is, circuit tripping) may be delayed by the time delay device 200 if the linkage 205 engages a pin 300 on a delay arm 305 of the time delay device 200. Movement of the delay arm 305 is slowed by hydraulic resistance to movement of a shaft 325 that extends out of the device 200. Alternately, opening of the contacts 215 may be instantaneous if the linkage 205 does not engage the time delay device 200 through the pin 300. When the contacts 215 are opened, the solenoid 210 is de-energized and the plunger 217 may be retracted by a spring 220. The lockout and sequence control system 225 counts a number of times the recloser 100 operates and initiates lockout (that is, it permanently opens the contacts 215) after a preset number of open/close operations. The contacts 215 remain open until they are manually reset by a human controller.

Figure 4:
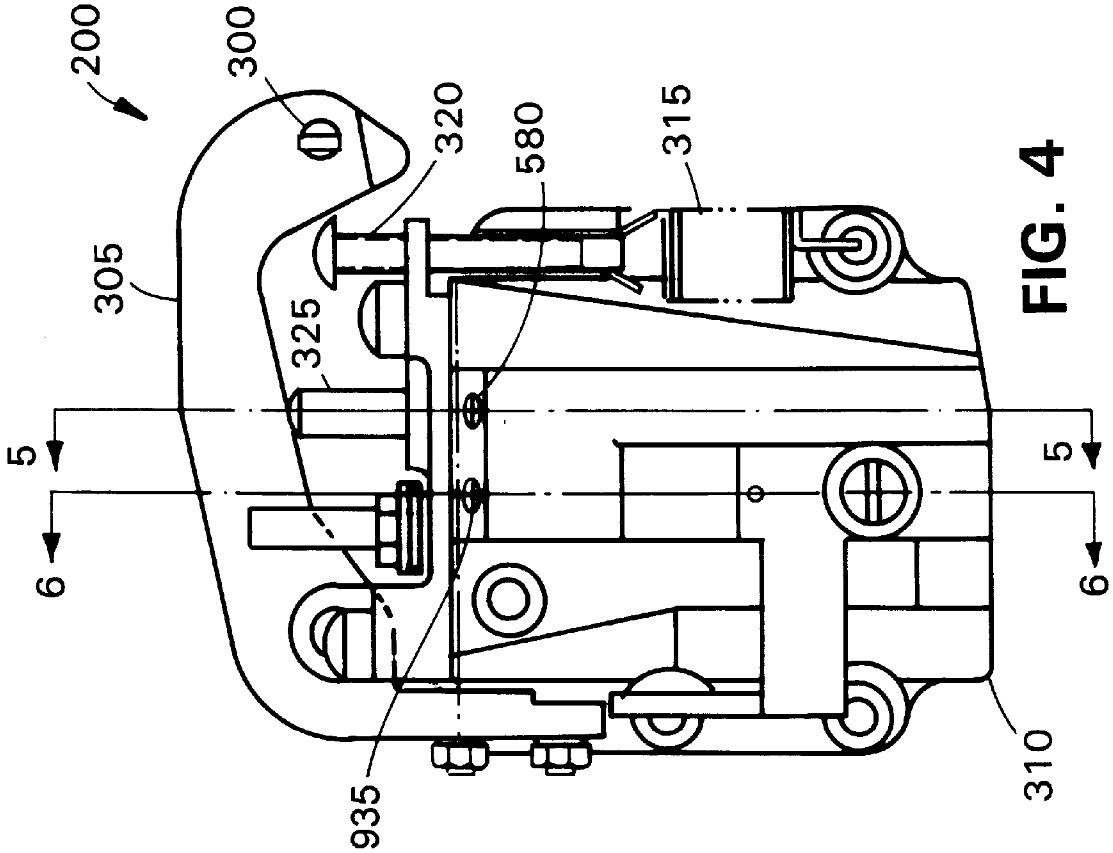
FIG. 4 is a front view of the time delay device of FIG. 3.
Figure 3:
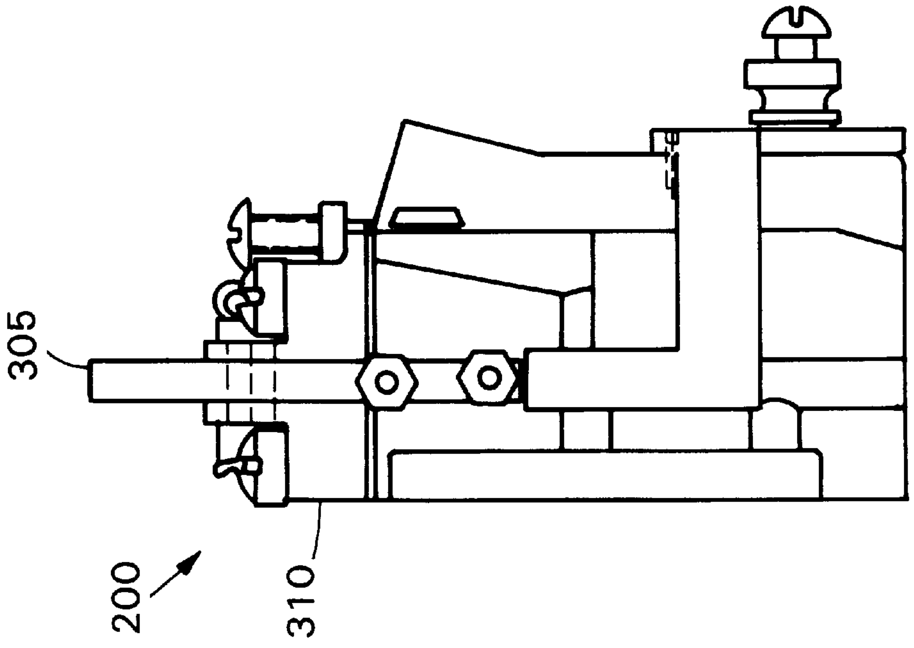
FIG. 3 is a side view of a time delay device used in the circuit recloser of FIG. 2.

Referring also to FIGS. 3 and 4, the time delay device 200 is activated when the linkage 205 engages the pin 300 extending transversely through the time delay arm 305 which is connected to a housing 310 of the time delay device 200. A force exerted by the solenoid on the arm 305 varies with the current on the line.

A minimum trip spring 315 is adjusted using a screw 320 to set a minimum fault current at which the recloser will trip open. On delayed opening operations, sequencing of the lockout and sequence control system 225 causes the linkage 205 to engage the pin 300 and activate the time delay device 200. Once the pin 300 is engaged, the delay arm 305 pushes down on the shaft 325 which extends into the housing 310. Movement of the delay arm 305 is slowed by hydraulic resistance to movement of the shaft 325 from within the housing 310. This resistance is transmitted to the time delay arm 305, and, in turn, to the linkage 205.

The time required for the interrupter contacts 215 to open is governed by the rate of movement of the magnetic plunger 217. The rate of movement is governed by the current level. Once the current level reaches a predetermined value, there is enough force to activate the plunger 217. Because the maximum uniform pull of the solenoid 210 is a function of current in the solenoid 210, an opening time of the interrupter contacts 215 is a function of fault current.

Figure 5:
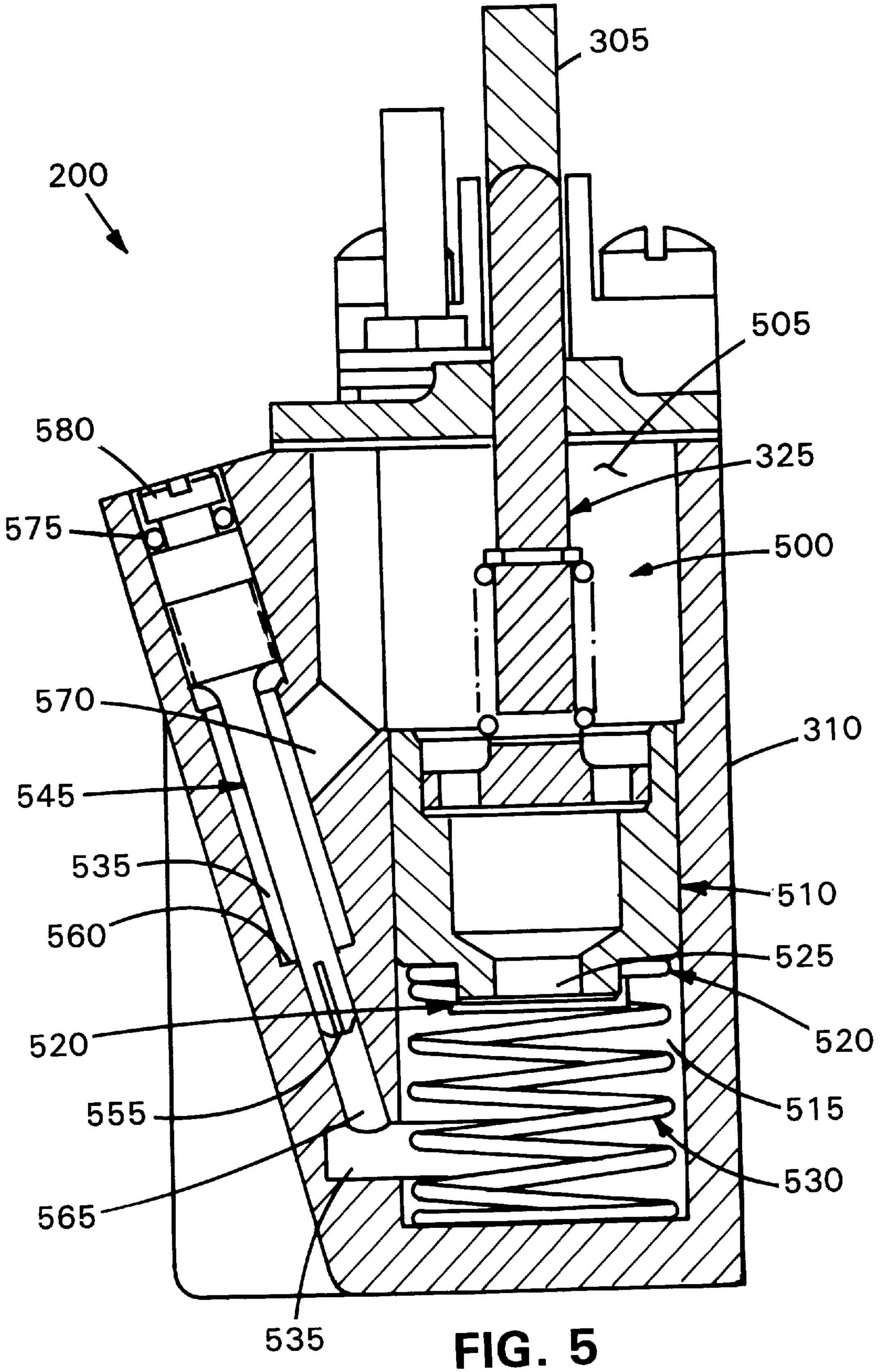
FIG. 5 is a sectional view through the time delay device of FIG. 4 along section 5—5.
Figure 6:
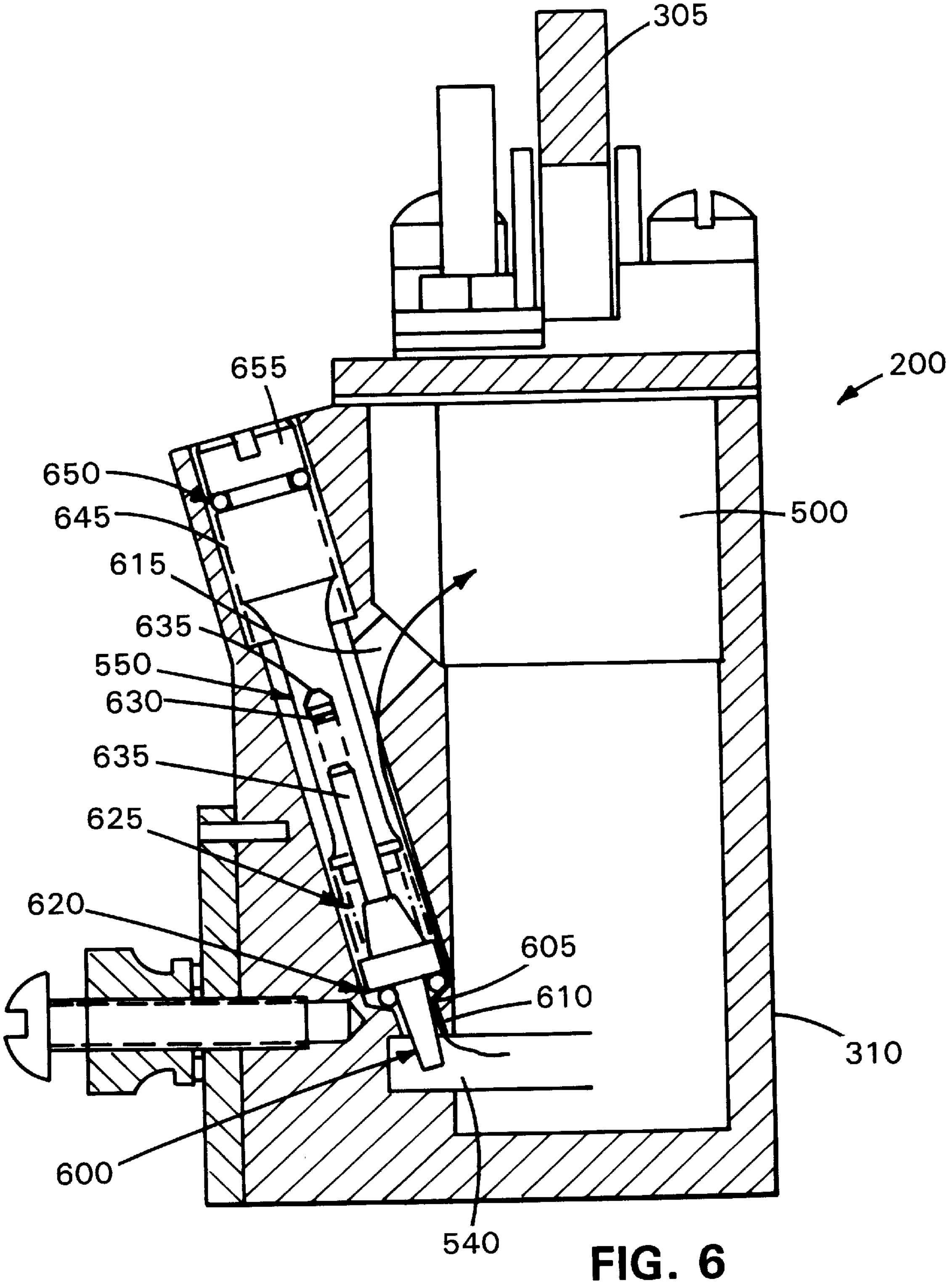
FIG. 6 is a sectional view through the time delay device of FIG. 4 along section 6—6 and showing a previous design of a high pressure adjustment mechanism.

FIGS. 5 and 6 are cross sectional views taken along sections 5—5 and 6—6, of FIG. 4. In general, the components shown in FIGS. 5 and 6 are consistent with prior art designs, and are illustrated to aid in understanding of operation of the time delay device 200.

Referring to FIGS. 5 and 6, the housing 310 of the time delay device 200 contains a sealed chamber 500 which is filled with hydraulic fluid 505. The shaft 325 pushes down a pump piston 510 in response to movement of the time delay arm 305. An upper surface of the pump piston 510 faces the chamber 500 while a lower surface of the pump piston 510 faces a cylinder 515 which receives the pump piston 510. A flapper valve 520 attached to the pump piston's lower surface seals the pump piston 510 to allow pumping on the downstroke by blocking an aperture 525 through which fluid 505 can flow. The flapper valve 520 opens to allow fluid 505 to freely flow from above the piston 510 to below through the aperture 525 on the upstroke. A force needed to return the piston 510 on the upstroke is provided by a spring 530 in the cylinder 515.

The fluid 505 pumped by the piston 510 on the downstroke flows into two passageways 535 and 540. The flow rate of the fluid 505 through the passageways 535, 540 is controlled by the setting of two sealed, self-locking adjustment screws 545 and 550 positioned inside the passageways 535 and 540, respectively. The passageway 535 provides a low pressure path while the passageway 540 provides a high pressure path.

At relatively low fault currents, the solenoid 210 does not exert a force sufficient to drive fluid 505 through the high pressure path. Accordingly, the rate of descent of the pump piston 510 at low values of fault current is governed by the sealed self-locking adjustment screw 545 and the passageway 535. With higher currents, and correspondingly higher forces, fluid 505 flows through both passageways such that the rate of descent of the pump piston 510 at medium and high fault currents is governed by the screw 545 and the screw 550.

The low pressure adjustment screw 545 has a slot 555 at its bottom end. As the screw 545 is adjusted, an orifice size defined by the slot 555 and the passageway 535 is varied by how much of the slot 555 is exposed above a small bore 560 connecting a lower passageway 565 to an entrance 570 into the chamber 500. Once the screw 545 is adjusted, the orifice size remains constant regardless of how much force is applied to the pump piston 510. The screw 545 is sealed in the passageway 535 and is locked in place by an O-ring 575 placed around an outer smooth surface of the screw 545. Adjustment is made by manipulating a head 580 of the screw 545, which is exposed at an outer surface of the housing 310.

Referring to FIG. 6, the medium/high pressure adjustment uses a valve 600 which varies an orifice size defined by a location of the valve 600 relative to a small bore 605 connecting a lower passageway 610 to an entrance 615 of the chamber 500. The valve 600 is sealed at the small bore 605 with a valve O-ring 620. Adjustment of the valve 600 is controlled by adjustment of the screw 550, which alters compression of a valve spring 625 that contacts the valve 600. Compression of the spring 625 determines an activation force at which the valve 600 opens through the small bore 605 and how far it opens when a particular force is applied to the pump piston 510. Once the valve 600 opens through the small bore 605, fluid 505 flows around the valve O-ring 620 and valve 600, up along an outside surface of the adjusting screw 550 and through the entrance 615 to the chamber 500.

Figure 7:
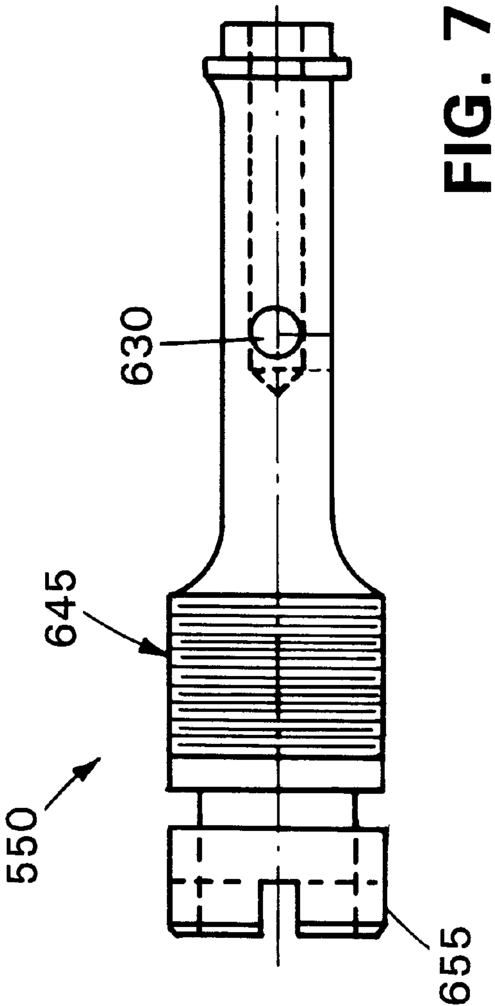
FIG. 7 is a cross sectional view of a high pressure screw used in the time delay device of FIG. 6.
Figure 8:
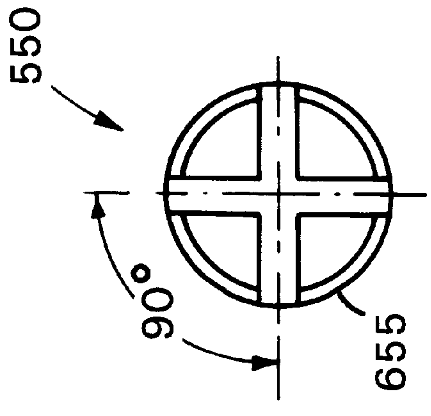
FIG. 8 is a top view of the high pressure screw of FIG. 7.

Referring also to FIGS. 7 and 8, a hole 630 may be formed in the adjusting screw 550 to permit unimpeded flow of the hydraulic fluid 505 through the passageway 540.

Furthermore, a valve stem 635 attached to the valve 600 may protrude into the adjusting screw 550 for alignment. Threads 645 are formed on an outer surface of the screw 550. These threads match with threads formed on an inner surface of the passageway 540 to permit adjustment of the screw 550. As with the low pressure adjustment, an O-ring 650 is used to seal the adjustment screw 550 and lock it in place. Adjustment is performed at a head 655 of the screw 550 which is exposed at an outer surface of the housing 310.

Upon descent of the pump piston 510, the hydraulic fluid 505 from cylinder 515 can either exhaust through passageway 535, slot 555, and entrance 570, or through passageway 540, past valve 600, and through entrance 615. If the force on the piston 510 is sufficiently small, passageway 535 will accommodate all of the fluid 505 displaced from cylinder 515. As a result, the pressure below valve 600 will be insufficient to overcome the biasing force of valve spring 625, valve 600 will remain in its closed position, and all of the fluid will exhaust through slot 555 and entrance 570.

By contrast, if a large fault current causes a large force on pump piston 510 and a rapid descent, the passageway 535 will be unable to accommodate all of the fluid, and pressure will build up until the pressure is sufficient to open valve 600 and permit fluid to exit through passageway 540.

Because a single valve adjustment is used to achieve two current level settings, operation of the time delay device 200 at high and medium currents is interdependent and desired settings are difficult to achieve.

Figure 10:
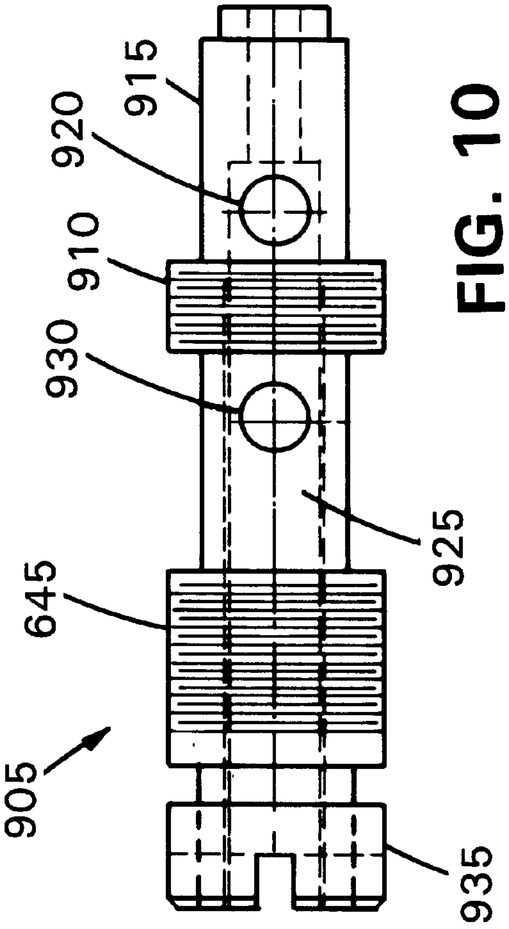
FIG. 10 is a cross sectional view of a pressure adjustment screw used in the time delay device of FIG. 9.
Figure 11:
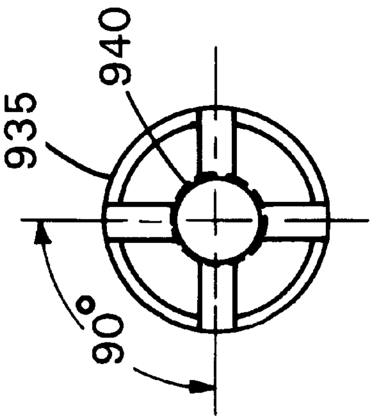
FIG. 11 is a top view of the pressure adjustment screw of FIG. 10.
Figure 9:
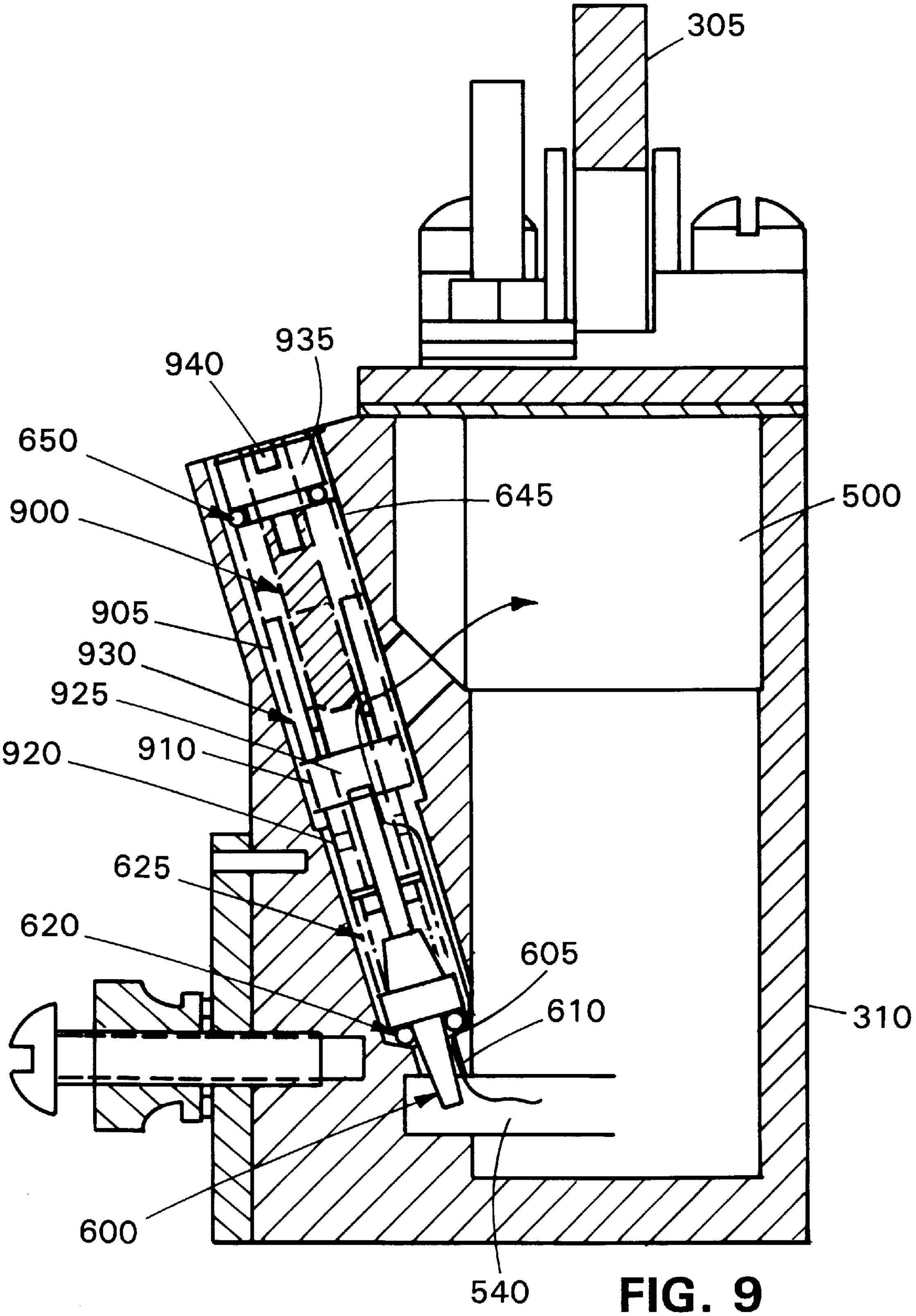
FIG. 9 is a sectional view through the time delay device of FIG. 4 along section 6—6 and showing a design of a new high pressure adjustment mechanism.

FIGS. 9–11 show a modification of the previous time delay device. The modification provides a third self-locking adjustment screw 900 formed inside another self-locking adjustment screw 905 that corresponds to the self-locking adjustment screw 550. The adjustment screw 900 provides a third adjustment that allows adjustment of a high pressure orifice size in addition to adjustment of the spring force which controls movement of the valve 600.

The adjustment screw 905 has a second set of threads 910 formed on a lower surface of the screw 905 that match with threads in the passageway 540 and align with threads 645 on an upper surface of the screw 905. The seal between the threads 910 and the passageway 540 restricts the free flow of fluid 505 around an outer surface 915 of the adjustment screw 905. The seal between the threads 910 and the passageway 545 eliminates the need for special machining of the small bore 605 in the lower passageway 610 and the outside surface of the screw 905 if the O-ring 620 is used. The resulting restriction forces the fluid 505 to flow through a lower cross hole 920 in the adjustment screw 905, up an internal passageway 925, and out through an upper cross hole 930 to bypass the restriction. The internal passageway 925 is threaded to allow insertion of the adjustment screw 900 down a center of the adjustment screw 905 to partially close off the upper cross hole 930 to provide an adjustment of the orifice size. The orifice size is defined by the location of the adjustment screw 900 relative to the upper cross hole 930. In this way an adjustment of the internal adjustment screw 900 provides an adjustment of the orifice size that is completely independent of the valve spring force setting provided by the adjustment of the adjustment screw 905.

The adjustment screw 900 may be a set screw to allow independent adjustment at a head 935 of the screw 905 using a top 940 of the set screw. A set of threads 945 are formed on an outer surface of the adjustment screw 900 to move the screw 900 through the internal passageway 925 of the screw 905. The threads 945 are coated with a nylon sealer to provide the sealing and locking function required for the adjustment screw 900, while the adjustment screw 905 uses the O-ring 650 for sealing and locking within the passageway 340.

Because hydraulic fluid 505 is substantially incompressible, the rate of discharge through the passageways 535 and 540 governs the rate at which pump piston 510 can descend and, hence, the time delay characteristics of the time delay device 200. This rate of discharge is governed by the biasing force of spring 625, the position of slot 555, and the position of adjustment screw 900. As a result, the time delay characteristics of the time delay device 200 may be varied by modifying the flow restricting effect of these elements.

Figure 12:
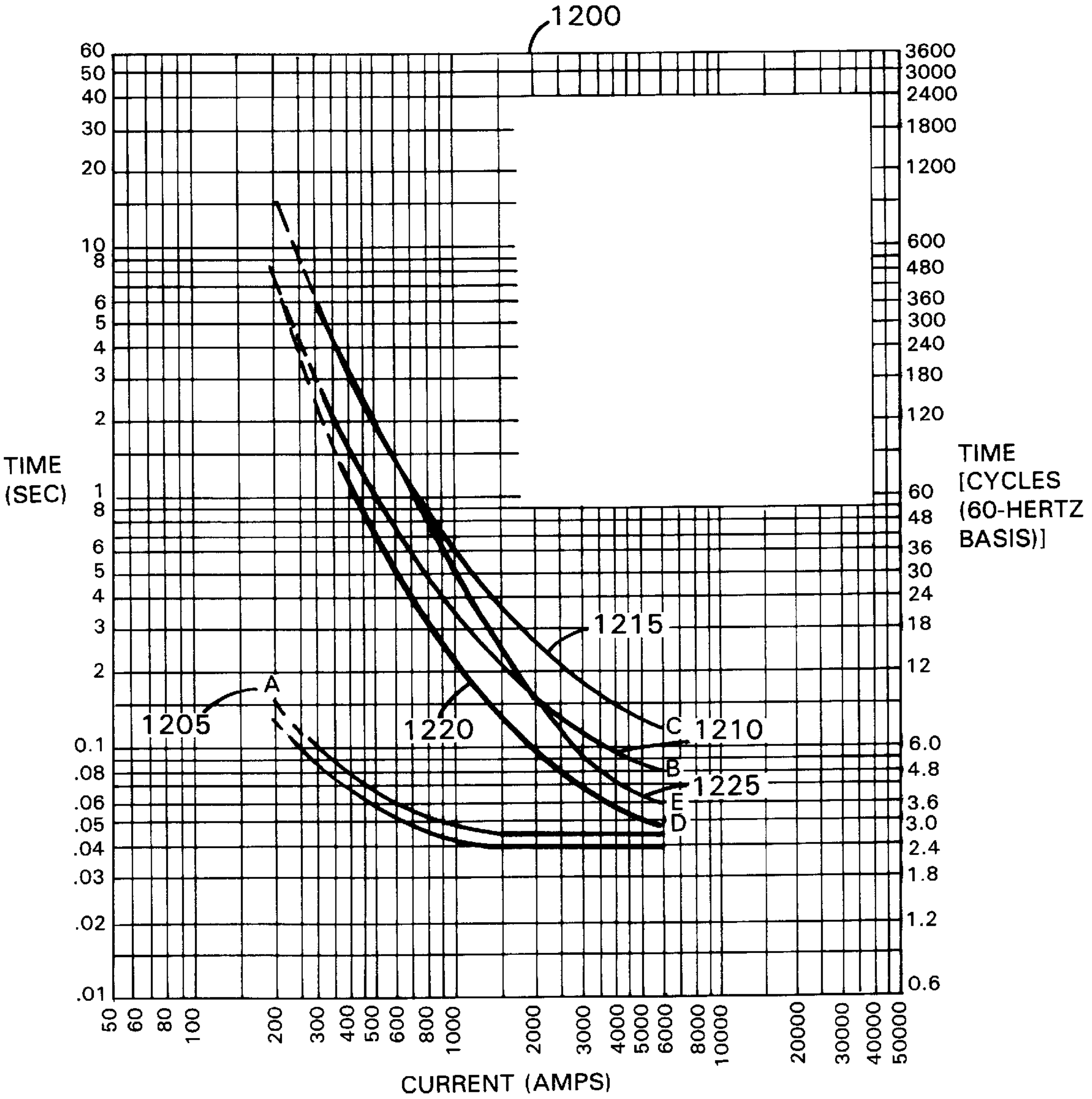
FIG. 12 is a generalized graph of a time-current characteristic curve for the time delay device.

FIG. 12 is a graph 1200 of a set of time-current characteristics which may be desired for a fault-sensing system on a high-voltage line. The curves designated by letter A 1205 represent a rapid opening operation which may be used to test the high-voltage line 125. The other curves (given by letters B, C, D, and E) represent time-current characteristics which are desired when a fault does not clear after the rapid opening operations have been performed by the recloser. The time-current curves B, C, D, and E may therefore be used to test devices 110 along the feeder lines 120. The time-current characteristics B and C are given by curves 1210 and 1215 of the graph 1200. The time-current characteristics D and E are given by curves 1220 and 1225 of the graph 1200.

In the previous time delay device, timing adjustment at both middle and high fault currents required reaming of orifices in the time delay housing 310, cutting or stretching the valve spring 625, filing the high pressure valve 600, or replacing parts or the whole time delay device. In the time delay device 200, replacement or alteration of parts such as the valve spring 625 or valve 600 is unnecessary since there are three adjustment screws 545, 905, and 900 which may be adjusted to better meet the curves B, C, D, and E desired for a time delay device 200 used with various solenoid sizes.

The time delay device 200 enables easier timing adjustment to within timing limits and provides a more stable adjustment. A saving in adjustment time should be realized. Additionally, the time delay device 200 can be adjusted to provide four separate delay timing curves (that is, B, C, D, and E) without changing parts as in the previous time delay device. Furthermore, since the self-locking adjustment screw (550 and 905) is the only part modified in the time delay device 200, it is possible to retain the exterior shape of the previous time delay device to allow new time delays to be installed on existing reclosers presently in service. Because of these advantages, the manufacturer and members of the power industry will notice a significant cost savings.

Other embodiments are within the scope of the claims.

What is claimed is:

1. A hydraulic time delay device for coupling to a fault-sensing element in a circuit recloser, the time delay device comprising:

a piston having an external connection and operable to move through a housing in the device to cause hydraulic fluid in the housing to flow out of the housing and into a passageway;

a first adjustable orifice formed in the passageway to define an adjustable first fluid flow path through the passageway;

an adjustable valve positioned to provide an adjustable second fluid flow path through the passageway; and a second adjustable orifice formed in the passageway to provide further adjustment of the second fluid flow path, wherein:

a time delay of the time delay device corresponds to a time required to move the piston, and adjustment of the first orifice, the valve, and the second orifice affect the time required to move the piston.

2. The time delay device of claim 1, further comprising a piston spring inside the housing, wherein the piston moves through the housing in a first direction in response to a force on the external connection and the piston spring asserts a force on the piston in an opposite direction.

3. The time delay device of claim 2, wherein the piston comprises an aperture that closes when the piston moves in the first direction to push the hydraulic fluid into the passageway, and opens when the piston moves in the opposite direction to permit the hydraulic fluid to flow through the aperture.

4. The time delay device of claim 1, wherein a size of the first orifice is adjustable.

5. The time delay device of claim 1, wherein an activation force of the valve is adjustable.

6. The time delay device of claim 1, wherein a size of the second orifice is adjustable.

7. The time delay device of claim 1, further comprising an adjustable screw that applies a force to the valve through a valve spring which couples the valve to the screw.

8. The time delay device of claim 7, wherein the force applied to the valve modifies the second fluid flow path.

9. The time delay device of claim 7, further comprising a set screw positioned inside the adjustable screw and operable to adjust the second orifice.

10. The time delay device of claim 1, wherein the circuit recloser is operable to open contacts in the circuit after the time delay.

11. The time delay device of claim 1, wherein the time delay device is coupled to the fault-sensing element through the external connection of the piston.

12. A hydraulic time delay device for coupling to a fault-sensing element in a circuit recloser, the time delay device comprising:

a piston having an external connection and operable to move through a housing in the device to cause hydraulic fluid in the housing to flow out of the housing and into a passageway, wherein a time delay of the time delay device corresponds to a time required to move the piston; and three adjustment mechanisms that affect the time required to move the piston, wherein adjustment of each adjustment mechanism is independent of adjustment of the other adjustment mechanisms.

13. The time delay device of claim 12, wherein a first adjustment mechanism corresponds to a first orifice formed in the passageway to define an adjustable first fluid flow path through the passageway.

14. The time delay device of claim 13, wherein a second adjustment mechanism corresponds to an activated valve positioned to provide an adjustable second fluid flow path through the passageway.

15. The time delay device of claim 14, wherein a third adjustment mechanism corresponds to a second orifice formed in the passageway to provide further adjustment of the second fluid flow path.

16. The time delay device of claim 12, wherein the circuit recloser is operable to open contacts in the circuit after the time delay.

17. The time delay device of claim 12, wherein the fault-sensing element links to the external connection of the piston.

18. A retrofit module for use in a hydraulic time delay device operable on a circuit recloser, the retrofit module comprising:

a valve;

an adjustable screw that applies a force to the valve through a valve spring which couples the valve to the adjustable screw, the adjustable screw comprising:

a cavity formed through an inner section of the adjustable screw;

a first orifice formed at a section of the cavity and configured to couple the cavity to an exterior of the module; and a second orifice formed at another section of the cavity and configured to couple the cavity to an exterior of the module; and another adjustable screw positioned inside the cavity and operable to adjust a size of the second orifice.

* * * * *